(No Model.)
W. D. ALBRIGHT.
COMBINED STAY AND ANCHOR FOR WIRE FENCES.
No. 551,882. Patented Dec. 24, 1895.
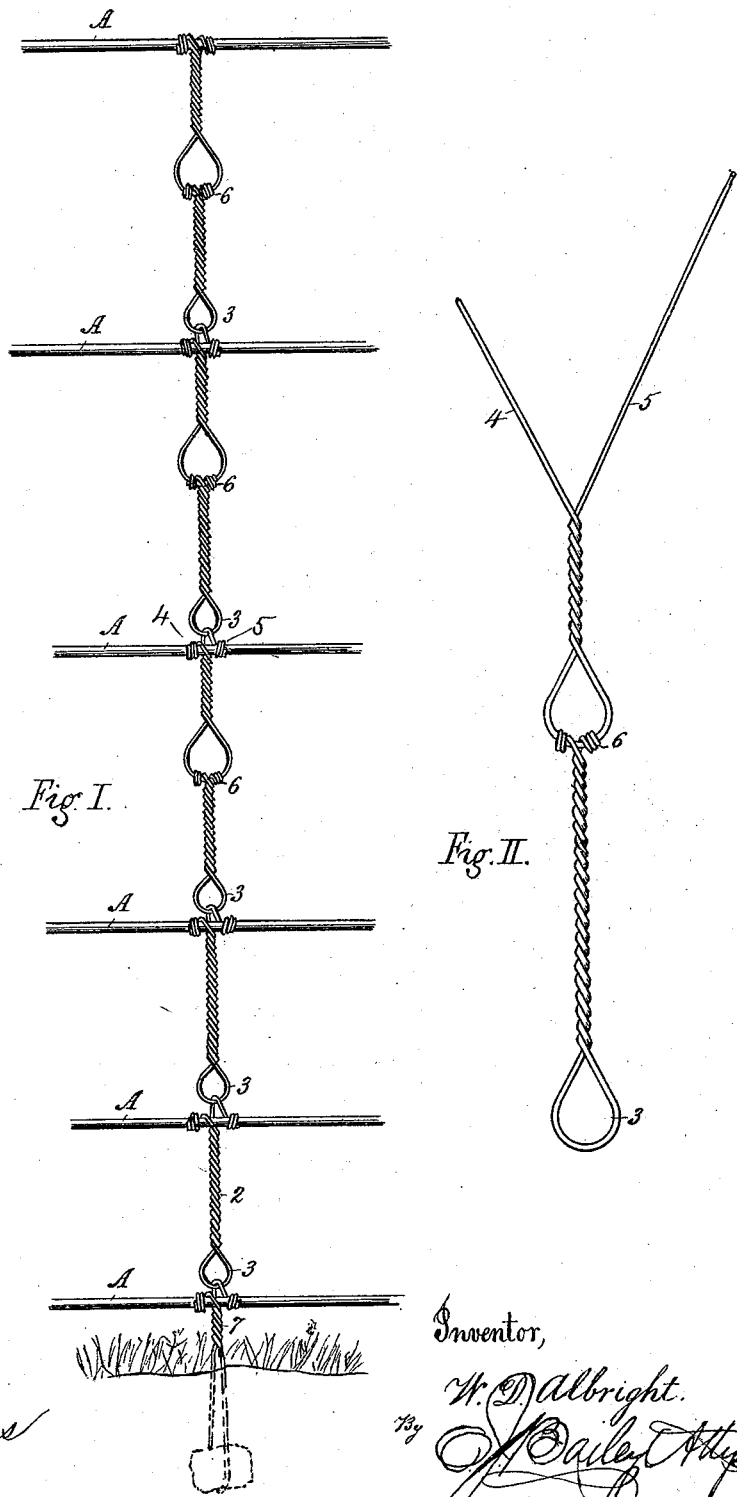

UNITED STATES PATENT OFFICE.

WILLIAM D. ALBRIGHT, OF GREENVILLE, OHIO.

COMBINED STAY AND ANCHOR FOR WIRE FENCES.

SPECIFICATION forming part of Letters Patent No. 551,882, dated December 24, 1895.

Application filed September 17, 1895. Serial No. 562,798. (No model.)

*To all whom it may concern:*

Be it known that I, WILLIAM D. ALBRIGHT, a citizen of the United States, residing at Greenville, in the county of Darke and State of Ohio, have invented a new and useful Improvement in a Combined Stay and Anchor for Wire Fences, which improvement is fully set forth in the following specification and accompanying drawings, in which—

Figure 1 is a side elevation of a section of wire fence provided with my improved stay, and Fig. 2 a detail view of one of the double sections of the stay prepared for attachment to the fence-wire.

My invention pertains to certain improvements in wire-fence stays and anchors combined, and its object is to improve the device described in my Patent No. 530,916, issued December 18, 1894.

The peculiar construction and advantages of this invention will be apparent by referring to the accompanying drawings, in which—

A represents a series of fence-wires connected by a flexible stay 2, each link of which is made of a single piece of wire bent near the center, forming a loop 3, after which the branches are twisted together to the length required to complete the link. The connection to the fence is made by passing the shorter branch 4 up on the rear side of the fence-wire and wrapping it around the same from left to right. The longer branch 5 is then extended up on the near side of the fence-wire and passed through the loop of the succeeding link, from which it is bent backwardly and then wrapped around the fence-wire from right to left, as shown in the drawings. It will be understood that the joints being thus constructed are not rigid, and if the fence should be exposed to lateral pressure the stays will yield for the time being, and when the pressure is removed will resume their normal position without being broken or otherwise deformed.

In order to secure the desired degree of flexibility in the stays connecting the upper wires of the fence, which are generally arranged farther apart than the lower wires, the stays are made in two sections and united, as at 6.

Each section of the fence is provided with an anchor 7, which consists of a looped wire inserted in a hole of suitable depth made by a spud or crowbar. The lower end of the loop encircles a stone or block of wood and the soil around it is compactly tamped. The upper ends of the wire are then attached to the lowermost fence-wire in the same manner as the stay-sections above.

The several advantages of the combination are obvious. The sections of the fence being thus centrally supported may be made longer than usual and fewer posts will be required. The sections being firmly attached to the ground are made practically secure against lateral pressure and cannot be lifted to permit the entrance or exit of swine or other small animals.

What I claim as new is—

The combination with a wire fence of a continuous flexible stay comprising a series of single sections for the lower fence wires each constructed of a single piece of wire doubled near its center to form a loop, then twisted to form a stock, and having its free ends separated and attached to the fence wire and one also to the adjoining section; a series of double sections for the upper fence wires centrally connected each to the other and to the fence wires as shown; and the herein described anchor attached to the ground and to the lowermost fence wire and stay section substantially as and for the purposes herein set forth.

In testimony that I claim the foregoing I have hereunto set my hand, this 31st day of August, 1895, in the presence of witnesses.

WILLIAM D. ALBRIGHT.

Witnesses:
 D. P. IRWIN,
 E. E. CALDERWOOD.